United States Patent
Dong et al.

(10) Patent No.: US 8,392,438 B2
(45) Date of Patent: Mar. 5, 2013

(54) METHOD AND APPARATUS FOR IDENTIFYING SYNONYMS AND USING SYNONYMS TO SEARCH

(75) Inventors: Jing Dong, Hangzhou (CN); Fei Xing, Hangzhou (CN); Ning Guo, Hangzhou (CN); Lei Hou, Hangzhou (CN); Qin Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 196 days.

(21) Appl. No.: 12/863,501

(22) PCT Filed: Apr. 23, 2010

(86) PCT No.: PCT/IB2010/001029
§ 371 (c)(1),
(2), (4) Date: Jul. 19, 2010

(87) PCT Pub. No.: WO2010/125463
PCT Pub. Date: Nov. 4, 2010

(65) Prior Publication Data
US 2011/0047138 A1    Feb. 24, 2011

(30) Foreign Application Priority Data
Apr. 27, 2009 (CN) .......................... 2009 1 0137633

(51) Int. Cl.
*G06F 7/00* (2006.01)
*G06F 17/30* (2006.01)
(52) U.S. Cl. ......... 707/758; 707/706; 707/737; 707/780
(58) Field of Classification Search .................. None
See application file for complete search history.

(56) References Cited

U.S. PATENT DOCUMENTS

| | | | |
|---|---|---|---|
| 6,366,910 B1 | 4/2002 | Rajaraman et al. | |
| 6,519,585 B1 | 2/2003 | Kohli | |
| 6,810,376 B1 * | 10/2004 | Guan et al. | 704/9 |
| 7,003,511 B1 | 2/2006 | Antonov | |
| 7,370,034 B2 | 5/2008 | Franciosa et al. | |
| 7,444,324 B2 | 10/2008 | Ortega et al. | |
| 7,475,063 B2 | 1/2009 | Datta et al. | |
| 7,523,102 B2 | 4/2009 | Bjarnestam et al. | |
| 7,617,202 B2 | 11/2009 | Brill et al. | |
| 7,627,548 B2 | 12/2009 | Riley et al. | |
| 7,653,618 B2 | 1/2010 | Andreev et al. | |
| 8,001,136 B1 * | 8/2011 | Papachristou et al. | 707/758 |
| 8,041,730 B1 * | 10/2011 | Upstill et al. | 707/769 |
| 2003/0063113 A1 | 4/2003 | Andrae | |
| 2004/0064447 A1 | 4/2004 | Simske et al. | |
| 2005/0033568 A1 * | 2/2005 | Yu et al. | 704/10 |
| 2005/0065920 A1 | 3/2005 | He et al. | |
| 2006/0241934 A1 * | 10/2006 | Izuha | 704/2 |

(Continued)

*Primary Examiner* — Khanh Pham
*Assistant Examiner* — Azam Cheema
(74) *Attorney, Agent, or Firm* — Lee & Hayes, PLLC

(57) ABSTRACT

A method and an apparatus for identifying synonym and utilizing such synonym to conduct search is disclosed. The disclosed method includes: obtaining arbitrary two words to be identified; determining whether a shortest edit distance between the two words less than or equal to an edit distance threshold; determining whether the two words to be identified exist in a preset knowledge database, and if an answer is yes then searching a smallest granularity type with highest weight value for each word in the knowledge database; and if the two word have the same smallest granularity type with highest weight value, then determining such two words are synonyms, or non-synonym otherwise. The disclosed techniques greatly improve accuracy of synonym identification and guarantee effect of synonym identification.

18 Claims, 7 Drawing Sheets

U.S. PATENT DOCUMENTS

| | | |
|---|---|---|
| 2007/0005590 A1 | 1/2007 | Thrasher |
| 2007/0011154 A1 | 1/2007 | Musgrove et al. |
| 2007/0088683 A1 | 4/2007 | Feroglia et al. |
| 2007/0112554 A1 | 5/2007 | Goradia |
| 2007/0118512 A1 | 5/2007 | Riley et al. |
| 2007/0288448 A1 | 12/2007 | Datta |
| 2009/0043760 A1 | 2/2009 | Orihara et al. |
| 2009/0157611 A1 | 6/2009 | Kipersztok |

* cited by examiner

METHOD AND APPARATUS FOR IDENTIFYING SYNONYMS AND USING SYNONYMS TO SEARCH

RELATED APPLICATIONS

This application is a national stage application of an international patent application PCT/IB10/001,029, filed Apr. 23, 2010, which claims priority from Chinese patent application, Application No. 200910137633.6, filed Apr. 27, 2009, entitled "METHOD AND APPARATUS FOR IDENTIFYING SYNONYMS AND USING SYNONYMS TO SEARCH", which applications are hereby incorporated in their entirety by reference.

TECHNICAL FIELD

This patent application covers the area of computer data processing, specifically a method and an apparatus for identifying synonyms and a method and an apparatus for using the identified synonyms to conduct search.

BACKGROUND

The current search technology is generally based on keywords. A user inputs keywords into a search engine for search and the search engine returns web pages containing such keywords. For example, when the user inputs Chinese word "数码照相机" (which means "digital photo camera" in English), the current Chinese search engine will firstly segment the input keyword that generally segment "数码照相机" into two Chinese terms "数码" (which means "digital" in English) and "照相机" (which means "photo camera" in English), and then return result web pages containing the two Chinese terms "数码" and "照相机"

In fact, because users have different backgrounds and habits, it is very likely that such users have same intentions but use different keywords to search. For example, the users who search Chinese word "数码照相机" (which means "digital camera" in English) and Chinese word "数码照相机" have exactly the same intentions. With respect to "数码照相机" the result web pages returned by the current search engine contain two terms "数码" and "照相机". . Some very valuable result web pages, however, may not be returned or not ranked at top positions due to the fact that they contain two terms "数码" and "相机" (which means "camera" in English). Provided that the search engine can find that "数码照相机" and "数码相机" are synonyms and merge and return result web pages that contain both of the two words, it will effectively improve the search accuracy and user experience.

Synonym is a unique phenomenon in natural language. Synonym mining is also a very meaningful work in natural language processing. Its implementation is a great help to rewrite search query and enrich search result so that users can have better search experiences. But replacement of synonyms when applied to the search application must be adequate. It cannot be simply resolved by using a synonym checklist. Because users are accustomed to keywords search and the characters or words same as the search query being highlighted in the results, not every user accepts replacement with different words or characters even if they have exactly the same meaning as the search query. For example, Chinese words "土豆" and "马铃薯" have exactly the same meaning (both of which mean "potato" in English). But when the user inputs "土豆" while "马铃薯" is unexpectedly highlighted in the results, he/she might think the search engine got problem. If "马铃薯" is not highlighted in the results, it is also very easy to be neglected by the user. Therefore, synonym in this disclosure refers to synonym suitable for search application.

The current method for automatic identification of Chinese synonym is as follows: to represent each specific word as a webpage, to establish a linkage relationship of the specific word with other words in the dictionary that are used to interpret the specific word, to assign a score to each such word. Such score represents a similarity between words. In other words, it regards interpretation and being interpreted relationships between different words as a type of hyperlink and page rank score is an index of similarity of semantics between different words, and then identifies synonym according to such similarity of semantics. This method mainly uses page rank score as index to determine synonym. The determination of page rank score relies on the available resources while such resources are quite arbitrary and hard to control. As an example of "potato", if the available resource emphasizes on the vegetable characterizations and outside appearances, it is very likely that "potato" will establish synonym relationship with "tuber" or "ellipsis." Therefore, such page rank score representing linkage relationship is very unreliable. Further such unreliability is difficult to be automatically detected, and thus such method cannot accurately identify required synonym so that the identification effectiveness cannot be guaranteed.

SUMMARY OF THE DISCLOSURE

On one hand, this disclosure is to provide a method and an apparatus for identifying Chinese synonym to solve the problem that the identification effectiveness of Chinese synonym cannot be guaranteed. On the other hand, this disclosure is to provide a method and an apparatus for search to enrich search result and information.

This disclosure describes a method for identifying Chinese synonym. The method comprises:

a. obtaining, by a server, any two Chinese words to be identified;

b. determining that a shortest edit distance between the two Chinese words is less than or equal to an edit distance threshold and then performing step c;

c. determining whether both of the two Chinese words exist in a preset knowledge database, and if an answer is yes then searching a smallest granularity type with highest weight value for each Chinese word in the knowledge database; and d. if the two Chinese words have the same smallest granularity type with highest weight value, then determining such two Chinese words are synonyms, or non-synonym otherwise.

Among these actions, action determining whether both of the two Chinese words exist in the preset knowledge database further comprises:

e. segmenting, by the server, one or more unfound Chinese words, if any, and then determining whether all of the Chinese words after segmentation exist in the knowledge database; if the answer is yes, then searching a smallest granularity type with highest weight value for each of such Chinese words in the knowledge database and performing following actions.

Among these actions, after action determining that the two Chinese words have the same smallest granularity type with highest weight value, there can be further actions comprising:

determining, by the server, whether any changeable character or word of the two Chinese words are among changeable characters of a preset common character table, if an answer is yes, then determining such two Chinese words are synonyms, or non-synonyms otherwise.

The knowledge database comprises: one or more terms and concepts. Each term or concept corresponds to at least one type and each type corresponding to the term or concept has a weight value.

Among these actions, action searching the smallest granularity type with highest weight value for each Chinese word in the knowledge database further comprises:

searching a term or concept corresponding to each Chinese word in the knowledge database; and finding the smallest granularity type with highest weight value for each Chinese word according to the at least one type corresponding to the term or concept and its weight value.

Among these actions, this method also comprises an action if determining the two Chinese words are synonyms then saving such identified synonyms in the synonym database.

This disclosure also provides a method for search. The method includes:

receiving, by a search engine, a query request from a user, the query request including a term to be searched;

searching, by the search engine, the term in a preset synonym database to find a synonym of the term;

conducting, by the search engine, a search by using the term and the synonym of the term; and returning, by the search engine, a result including both the term and the synonym to the user.

This disclosure also provides an apparatus for identifying Chinese synonym. The apparatus includes:

a retrieval unit configured to obtain any two Chinese words to be identified;

a first determination unit configured to determine that a shortest edit distance between the two Chinese words is less than or equal to an edit distance threshold and inform a second determination unit;

the second determination unit configured to determine that both of the two Chinese words exist in a preset knowledge database and inform an query unit;

the query unit configured to find a smallest granularity type with highest weight value for each Chinese word in the knowledge database;

a third determination unit configured to determine that the two Chinese words are synonyms when the two Chinese words have the same smallest granularity type with highest weight value and to determine the two Chinese words are non-synonyms when the two Chinese words do not have the same smallest granularity type with highest weight value.

The apparatus further includes a segmentation unit configured to segment one or more unfound Chinese words in the knowledge database and then to inform the second determination unit.

The second determination unit is further configured to determine that all of the Chinese words after segmentation exist in the knowledge database and to inform the query unit, and to determine that not all of the Chinese words after segment exist in the knowledge database and to inform the segmentation unit.

The apparatus also further includes a common character table query unit configured to determine that changeable words or characters of the Chinese words, if any, are among changeable characters of a preset common character table and inform the third determination unit that the two Chinese words are synonyms, and to determine that changeable words or characters of the Chinese words, if any, are not among changeable characters of the preset common character table and to inform the third determination unit that the two Chinese words are non-synonyms.

The knowledge database comprises: one or more terms and concepts. Each term or concept corresponds to at least one type and each type corresponding to the term or concept has a weight value.

The apparatus is a server or search engine.

This disclosure also describes an apparatus for search. The apparatus includes:

a retrieval unit configured to receive a query request from a user, the query request including a term to be searched;

a synonym searching unit configured to find a synonym of the term by searching the term in a synonym database to a search unit configured to conduct a search by using the term and the synonym of the term; and a return unit configured to return a search result to the user.

The disclosed method and apparatus for identifying Chinese synonym will improve accuracy of search results without surprising the user as the disclosed techniques firstly determine the shortest edit distance of the Chinese words to be identified and thus there would be few expression variances between the synonyms. In addition, the disclosed techniques validate semantics of the Chinese words to be identified by using knowledge database so that they greatly improve accuracy of synonym identification and guarantee identification effect of synonym.

The disclosed method and apparatus for search not only avoid surprising users during search and enrich search results so that the returning results better meet the user's need.

DESCRIPTION OF DRAWINGS

To better illustrate the disclosed techniques or current technologies, the detailed description is described with reference to accompanying figures. The following is a brief introduction of the figures. It is apparent that the following figures are only some examples of the disclosed techniques. The person of ordinary skill in the art can develop other figures based on the following figures without making creative efforts.

DETAILED DESCRIPTION

The present disclosure will give a clear and full description of the disclosed techniques by reference to the figures. It is apparent that implementations described herein are only a portion instead of whole implementations of the disclosed disclosure. All of the other implementations that the person of ordinary skill in the art can develop based on the present disclosure without making creative efforts are under protection of the present disclosure.

This disclosure uses shortest edit distance algorithm and utilizes defined small edit distance so that there will not be big expression variances between synonyms and will not surprise users in the search applications. In addition, the disclosure also uses a knowledge database for shallow semantics validation to greatly improve accuracy of synonyms. The obtained synonym list has good effects for search-related applications and can certainly be used in the relevant applications other than search.

The edit distance refers to a number of minimum basic operations required to change from one string to another string, or can be understood as an addition of length of different portion of the two strings. Generally, basis operation includes inserting a character/word, deleting a character/word, replacing a character/word, or any other defined operations based upon requirements. For example, the change from Chinese word "我爱你" (which means "I love you" in English) to "我不爱她" (which means "I don't love her" in English) needs at least two basic operations, i.e. inserting Chinese character "不" (which means "don't" in English), and replacing "你" (which means "you" in English) with "她" (which means "her" in English). So the edit distance between the two is 2. For the same reason, the edit distance between Chinese words "隐形的翅膀" (which means "invisible wing" in English) and "好吃 的鸡翅" (which means "delicious chicken wing" in English) is 3. The calculation of such edit distance, i.e. inserting a character/word, deleting a character/word, and replacing a character/word, is existing technology.

Figure 1:
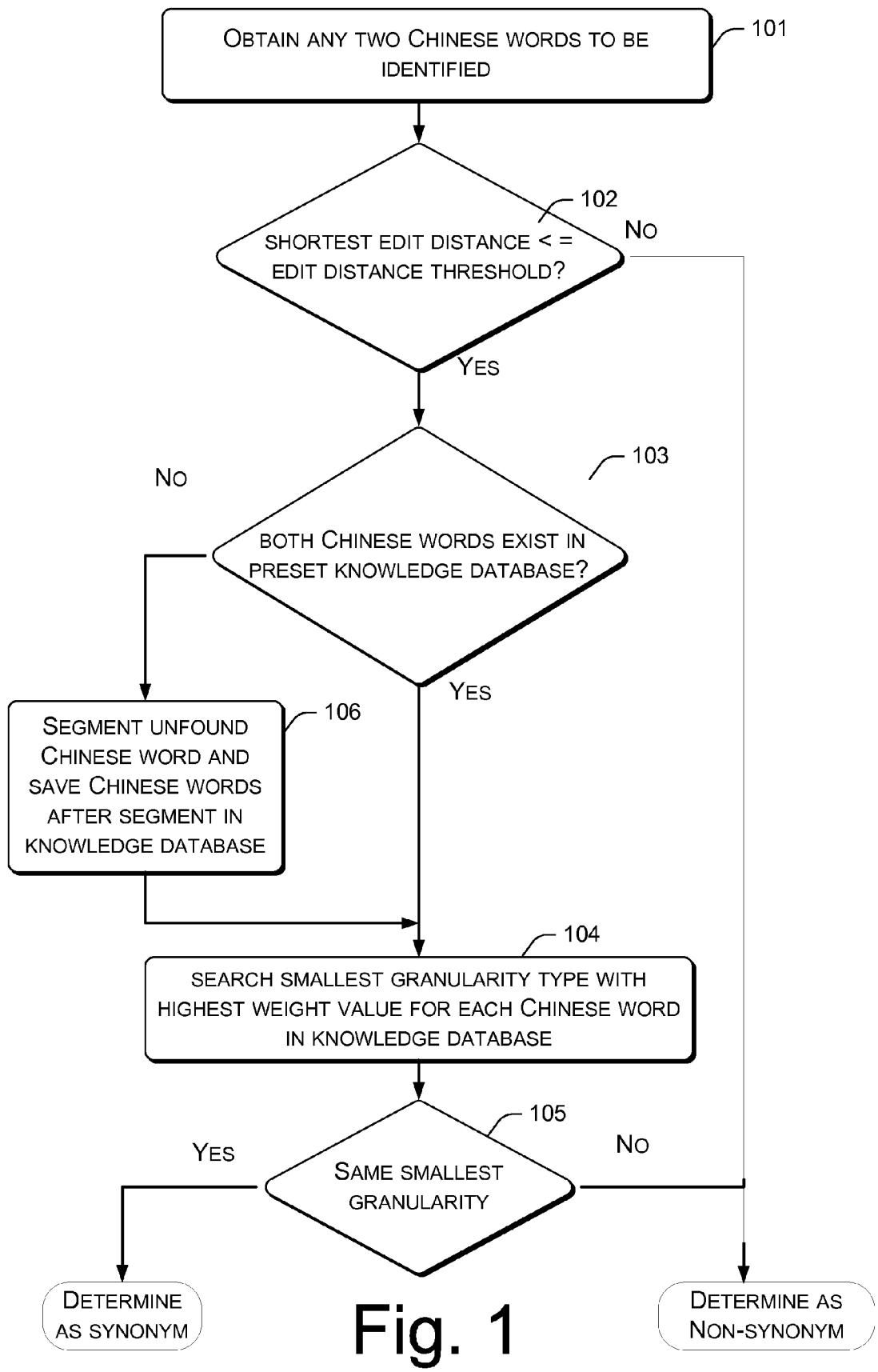
FIG. 1 illustrates an exemplary process flowchart for identifying Chinese synonym according to the present disclosure.

FIG. 1 illustrates an exemplary process flowchart for identifying Chinese synonym according to the present disclosure. The purpose of this example is to determine whether two Chinese words to be identified are synonyms. The detailed steps are as follows:

A step 101 comprises obtaining, by a server, any two Chinese words to be identified.

Generally, these two Chinese words are any two Chinese words obtained from a query log of a search engine. To improve efficiency, it can choose top 100,000 terms according to query inputs from the query log and then compare any of two Chinese terms among the 100,000 words one by one.

The server can be the search engines itself or any server specifically configured to compare synonyms for users, or any other server having computing functionality.

A step 102 comprises determining, by the server, that a shortest edit distance between the two Chinese words is less than or equal to an edit distance threshold and then performing a step 103.

If the shortest edit distance of the two Chinese words is larger than the edit distance threshold, then the server directly determines that the two Chinese words are non-synonyms.

Here, the edit distance threshold can be 1, 2, 3, or etc. It can be understood that the smaller edit distance, the smaller variance between the two words.

The step 103 comprises determining whether the two Chinese words exist in a preset knowledge database, and if an answer is yes then performing step 104.

Details of the knowledge database are described herein later.

A step 104 comprises searching, by the server, a smallest granularity type with highest weight value for each Chinese word in the knowledge database.

Details of the weight and granularity type in the knowledge database are described herein later.

A step 105 comprises if the two Chinese words have the same smallest granularity type with highest weight value, then determining, by the server, such two Chinese words are synonyms; if not, then determining, by the server, such two Chinese words are non-synonyms.

To be noted, if not all of the two Chinese words exist in the knowledge database, then the steps further comprises a step 106 comprises segmenting, by the server, one or more unfound Chinese words, and then determining whether all of the Chinese words after segmentation exist in the knowledge database; if the answer is yes, then performing following steps or continuing performing the step 106 otherwise.

To be noted, this example can further comprise: saving identified synonyms into a synonym database for future use. Synonym database can be in a form of table that saves the identified synonym. One possible implementation of the table that saves the identified synonym is to save corresponding words or characters that are synonyms between each other for search convenience. For example, if terms A1 and A2, B1 and B2, C1, C2, and C3 are synonyms between each other, the saving form can be referred to Table 1.

TABLE 1

| Serial No | Query Term | Synonym 1 | Synonym 2 |
|---|---|---|---|
| 1 | A1 | A2 | |
| 2 | A2 | A1 | |
| 3 | B1 | B2 | |
| 4 | B2 | B1 | |
| 5 | C1 | C2 | C3 |
| 6 | C2 | C1 | C3 |
| 7 | C3 | C1 | C2 |
| ... | ... | ... | ... |

It is apparent that the table saving synonyms is not limited to the form as shown in Table 1. This disclosure does not limit the detailed form to save synonyms as long as the synonyms of the query term can be timely found.

The disclosed method for identifying Chinese synonym will not surprise the user as the disclosed techniques firstly determine the shortest edit distance of the Chinese words to be identified and thus there are few expression variances between the synonyms. In addition, the disclosed techniques use knowledge database to validate semantics of the Chinese words to be identified so that they greatly improve accuracy of synonym identification and guarantees effects of synonym identification.

The Chinese synonyms determined by this disclosure can be used not only in the search-related industry but also other industries.

Figure 2:
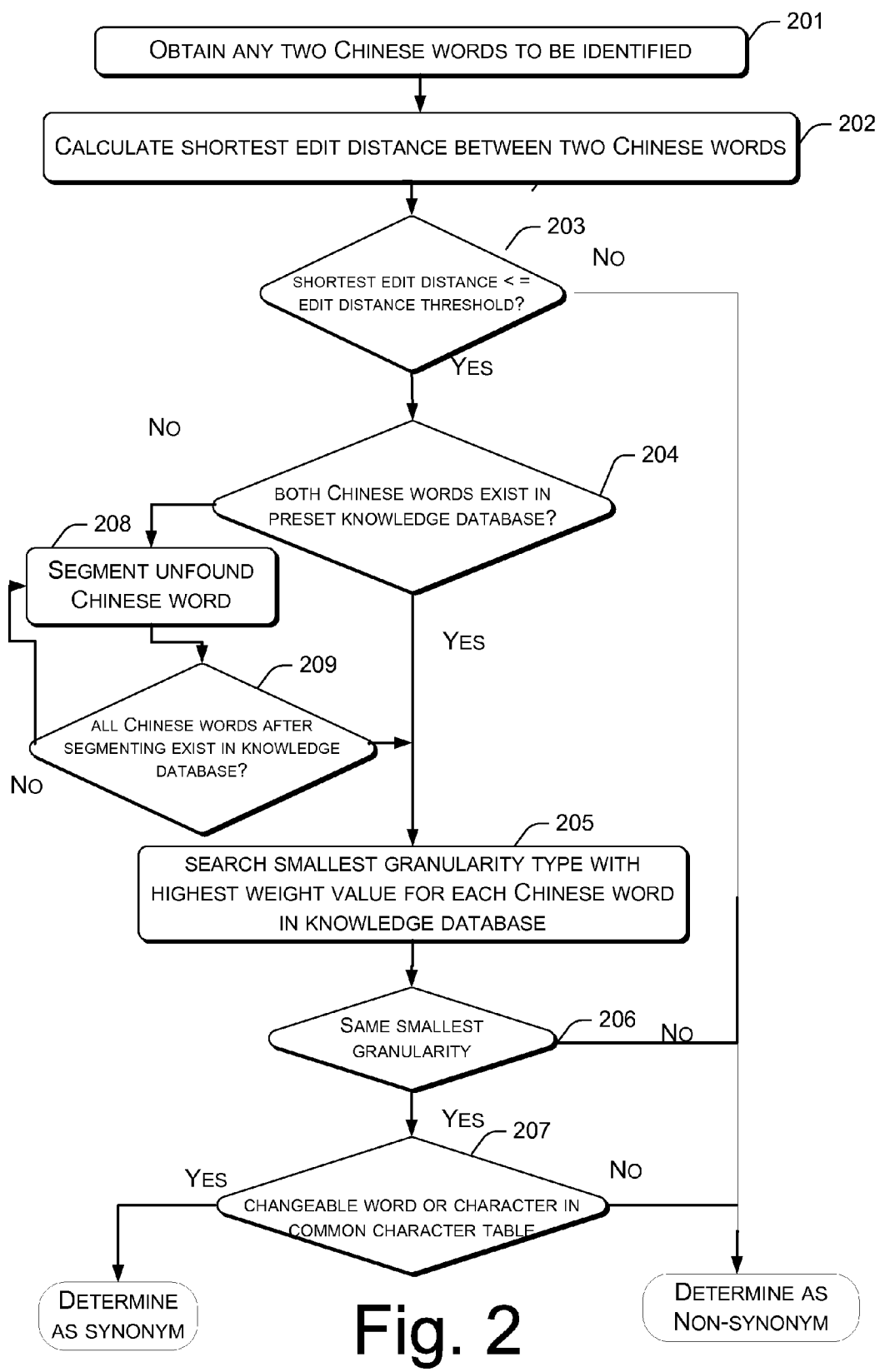
FIG. 2 illustrates a better exemplary flowchart according to the present disclosure.

FIG. 2 illustrates a better exemplary flowchart according to the present disclosure. The details are as follows:

A step 201 comprises obtaining, by a server, any two Chinese words to be identified.

Generally, these two Chinese words to be identified are high frequency words that appear regularly in the log, such as those appear more than 20 times. Because high frequency words are representative, their regular appearance guarantee the words to be identified are not esoteric. In addition, it is better that the number of characters of the Chinese words does not go beyond a threshold such as 8. This is to facilitate fast calculation of edit distance. Also there is less probability to find a synonym of a word having more characters.

In this example, the two Chinese words to be identified are obtained from query log of a search engine.

A step 202 comprises calculating, by the server, a shortest edit distance between the two Chinese words.

Dynamic programming algorithm or other algorithms can be used to calculate the shortest edit distance between the two Chinese words. This disclosure does not limit the applicable algorithm to calculate the shortest edit distance.

In the current dynamic programming algorithm, a smallest unit of each word is character. As an example of two words W1 and W2, each is comprised of c1c2c3 and d1d2d3 respectively. The short distance Dis (c1c2c3, d1d2d3) between c1c2c3 and d1d2d3 can be obtained from the shortest distance of their child strings. The detailed calculation method is as follows: if c3=d3, Dis (c1c2c3, d1d2d3)=Dis (c1c2, d1d2)+1. If the two are not same, Dis (c1c2c3, d1d2d3)=Max (Dis (c1c2, d1d2d3, Dis (c1c2c3, d1d2)), wherein Max represents a maximum value between the two. This is dynamic programming algorithm.

A step 203 comprises determining, by the server, whether the calculated shorted edit distance is less than or equal to an edit distance threshold and if an answer is yes, then performing a step 204, or determining that the two Chinese words are non-synonyms otherwise.

In a better implementation example, the edit distance threshold is assigned to value 1.

Because the identified synonyms in this disclosure are mainly used in query rewriting in search application, such assignment can increase a successful rate of result and enrich result collection. The query rewriting, simply speaking, refers to replacing user input keywords with its synonym for search. With respect to a search engine based on segmentation, if the user searches Chinese word "婴幼儿奶粉" (which means "baby child formula" in English) then a result including Chinese word "婴儿奶粉" (which means "baby formula" in English) cannot be found. Such result can be found when "婴儿奶粉" is replaced by its synonym "婴儿奶粉" There is a risk for user experience if multiple characters are changed and highlighted after query rewriting even though there is not much difference in meaning between the original query and rewritten query, because the user is accustomed to keywords being highlighted in the results and big changes may cause some users uncomfortable. So the recommended edit distance threshold value is equal to 1 here. In other words, if two Chinese words are synonyms, there are few expression variances between the two.

The step 204 comprises searching, by the server, whether both of the two Chinese words exist in a preset knowledge database, and if an answer is yes then performing a step 205, or performing a step 208 otherwise.

The knowledge database is in fact a document of dictionary or a concept database comprised of one or more terms and concepts. A term can be understood as a basic word and a concept can be understood as a combination of terms but such combination is a fixed combination regularly used in daily life. For example, each of "Apple", "Beijing", and "University" is a term while "Beijing University" is a concept in the knowledge database.

The knowledge database is a database. Each item represents a word and each item includes multiple fields including word, type of word, and weight value of type.

The knowledge database has at least one predefined type, and usually has tens of types. Such types are classified into multi-levels, each level corresponding to one granularity. Because a type is classified into multi-levels, a type corresponds to different levels has multiple granularities. Such granularity corresponding to multiple levels is called granularity type. Type is a predefined attribute. All of these attributes are defined by reference to linguistics. All words are assigned into types in advance.

Figure 3:
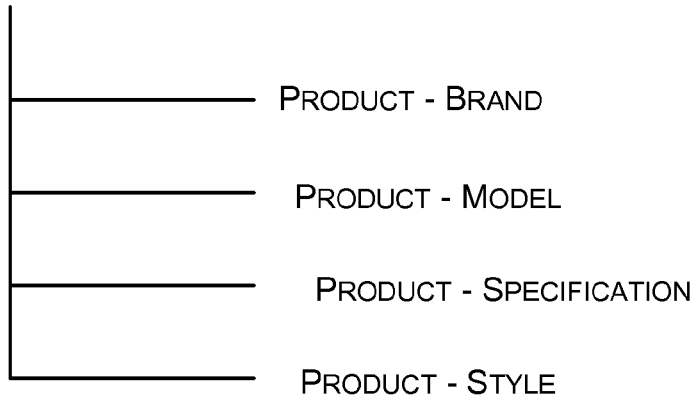
FIG. 3 illustrates an exemplary diagram of a knowledge database with levels of types according to the present disclosure.
Figure 3:
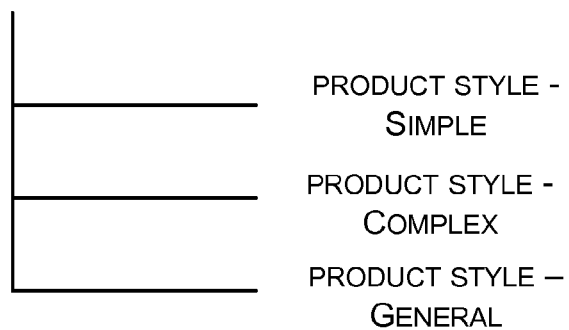

For example, FIG. 3 illustrates an exemplary diagram of a knowledge database with levels of types according to the present disclosure. In this example, "product" belongs to a higher level type and is a first level type. "Product-brand", "product-model", "product-specification", and "product-style" are different types under level of "product." In other words, "product-brand", "product-model", "product-specification", and "product-style" are second level types subordinate to the first level type. There are also third level types such as "product style-simple", "product style-complex", and "product style-general" subordinate to "product-type." In this example, the third level types "product style-simple", "product style-complex", and "product style-general" are the smallest granularity types.

Each term or concept in the knowledge database corresponds to at least one level of type. For example, "Apple" belongs to not only "product style-simple" but also "vegetable" type, while "Car" only belongs to "product style-general." Further, each term or concept has a weight value that represents a probability that such term or concept belongs to the type. For example, the weight value that "Apple" belongs to "product style-simple" type is 0.38 and the weight value that "Apple" belongs to "vegetable" type is 0.54.

It is understandable that the above types, levels of types, and weight value of a term or concepts belonging to a type in the knowledge database are obtained from experience accumulation. The experience accumulation means that the types, levels of types in the knowledge database are obtained by reference to linguistics while the weight of each word is calculated by statistics from webpage resources. As an example of "Apple", it appears 60 times as computer product and 40 times as vegetable. Its weight values of "product style-simple" and "vegetable" are 0.6 and 0.4 respectively.

The step 205 comprises searching, by the server, a smallest granularity type with highest weight value for each Chinese word in the knowledge database.

It is understandable that because each term or concept in the knowledge database corresponds to at least one type and related weight value, the smallest granularity type with highest weight value for each Chinese word can be found.

A step 206 comprises determining, by the server, whether the two Chinese words have the same smallest granularity type with highest weight value, and if an answer is yes then performing a step 207, or determining that the two Chinese words are non-synonyms.

It is understandable that the smallest granularity type more strictly limits semantics of the Chinese words to be identified and guarantees the accuracy of the identified synonyms.

The step 207 comprises determining, by the server, whether a changeable word or character of the two Chinese words, if any, belongs to changeable characters of a preset common character table.

The common character table is similar to knowledge database. It can be a text document with each line representing a common character.

The common character table includes two portions: changeable characters and unchangeable characters. Changeable characters are often postfixes of words with multiple characters and such postfixes have high appearance frequencies, such as Chinese character "机" or "器" (both means "machine" in English). Unchangeable characters are often prefixes or postfixes of words and often change the meaning of the words. The examples are Chinese character "不" (which means "no" or "none" in English), "非" (which means "un" in English), "半" (which means"semi" in English). The common character table is also obtained from experience accumulation or human review.

It is understandable that the existence of common character table further guarantees the effects of synonym identification.

The step 208 comprises segmenting, by the server, one or more unfound Chinese words.

The one or more unfound Chinese words can be both of the two Chinese words, either one of them, or Chinese words after segment processing.

A step 209 comprises determining, by the server, whether all Chinese words after segment processing exist in the knowledge database, and if an answer is yes then returning to the step 205, or continue performing the step 208 otherwise.

The above method for identifying Chinese synonym can be used in search engine and any other applicable server or device.

To be noted, this example can further comprise: saving identified synonyms into a synonym database for future use. The synonym database can be in a form of table that saves the identified synonym. One possible implementation of the table that saves the identified synonym is to save corresponding words or characters that are synonyms between each other one by one for search convenience. This disclosure does not limit the detailed form to save synonym as long as the synonym of the query term can be timely found.

The disclosed method as shown in FIG. 2 for identifying Chinese synonym will not surprise the user as the disclosed method firstly determines the shortest edit distance between the Chinese words to be identified and thus there are few expression variances between the synonyms. In addition, the disclosed method uses knowledge database to validate semantics of the Chinese words to be identified or more strictly limits the semantics of the words to be identified through the smallest granularity type, and thus greatly improve accuracy of synonym identification. Furthermore, the disclosed method uses common character table to re-validate different characters of the Chinese words to be identified and further guarantees effects of synonym identification.

There can be following applications for the identified synonym database:

When the search engine receives the query term input by the user, it finds synonym of the query words from the synonym database. Afterwards, the search engine uses the query term input by the user and its synonym to conduct separate searches, and returns the two search results to the user. This avoids surprising user in the search application, enriches the search result, and makes the search result better meet the user's need and thus can be applied in rewriting query requests in the search engine. For example, the user users the search engine to search "数码照相机" (which means "digital photo camera" in English), the search engine obtains that "数码相机" (which means "digital camera" in English) is a synonym of "数码照相机." The search engine then conduct search by using "数码相机" and "数码照相机" separately, and return search results that contain "数码照相机" and "数码相机." This not only enriches search results but also avoids missing information needed by the user.

Figure 6:
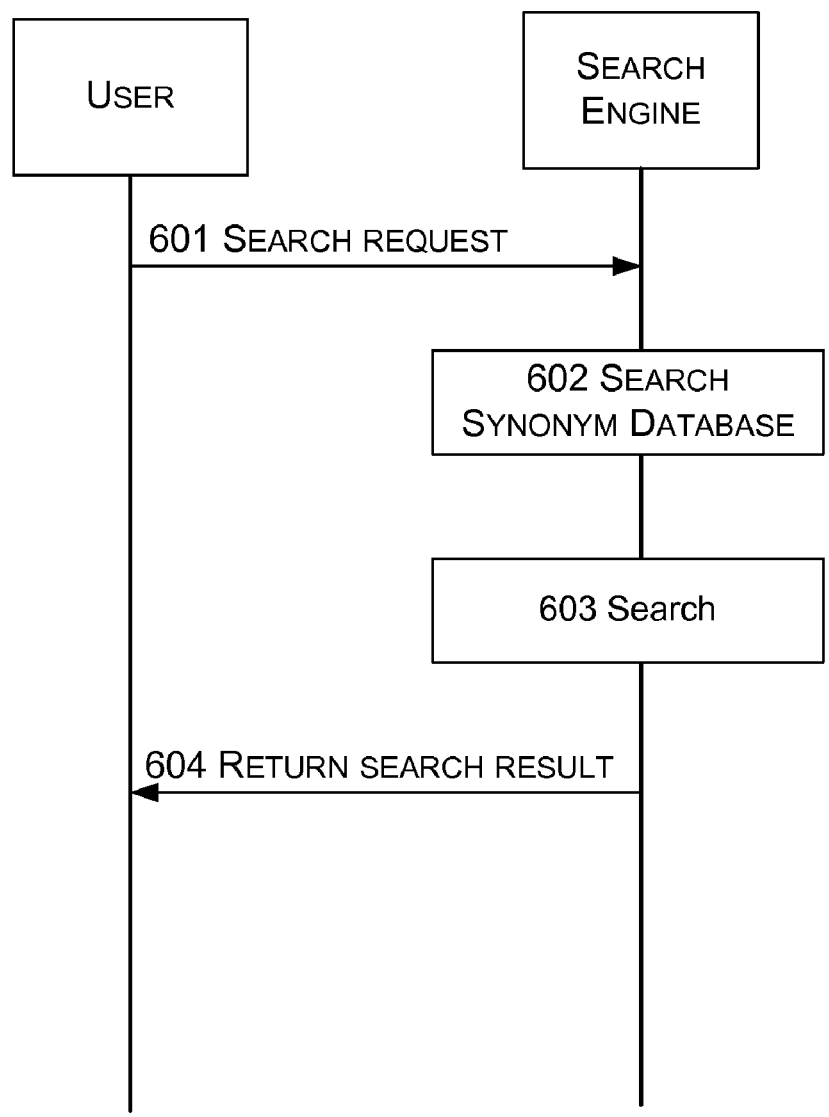
FIG. 6 illustrates an exemplary flowchart of a search method according to the present disclosure.

Based on the above application, this disclosure also provides a method for search by reference to FIG. 6. The method includes:

A step 601 comprises a user's inputting query term and submitting a query request to a search engine.

A step 602 comprises receiving, by the search engine, the query request from the user including query term, and searching, by the search engine, a preset synonym database to find a synonym of the query term.

A step 603 comprises conducting, by the search engine, searches according to the query term and the synonym of the query term.

A step 604 comprises returning, by the search engine, search results containing the query term and the synonym of the query term.

Figure 4:
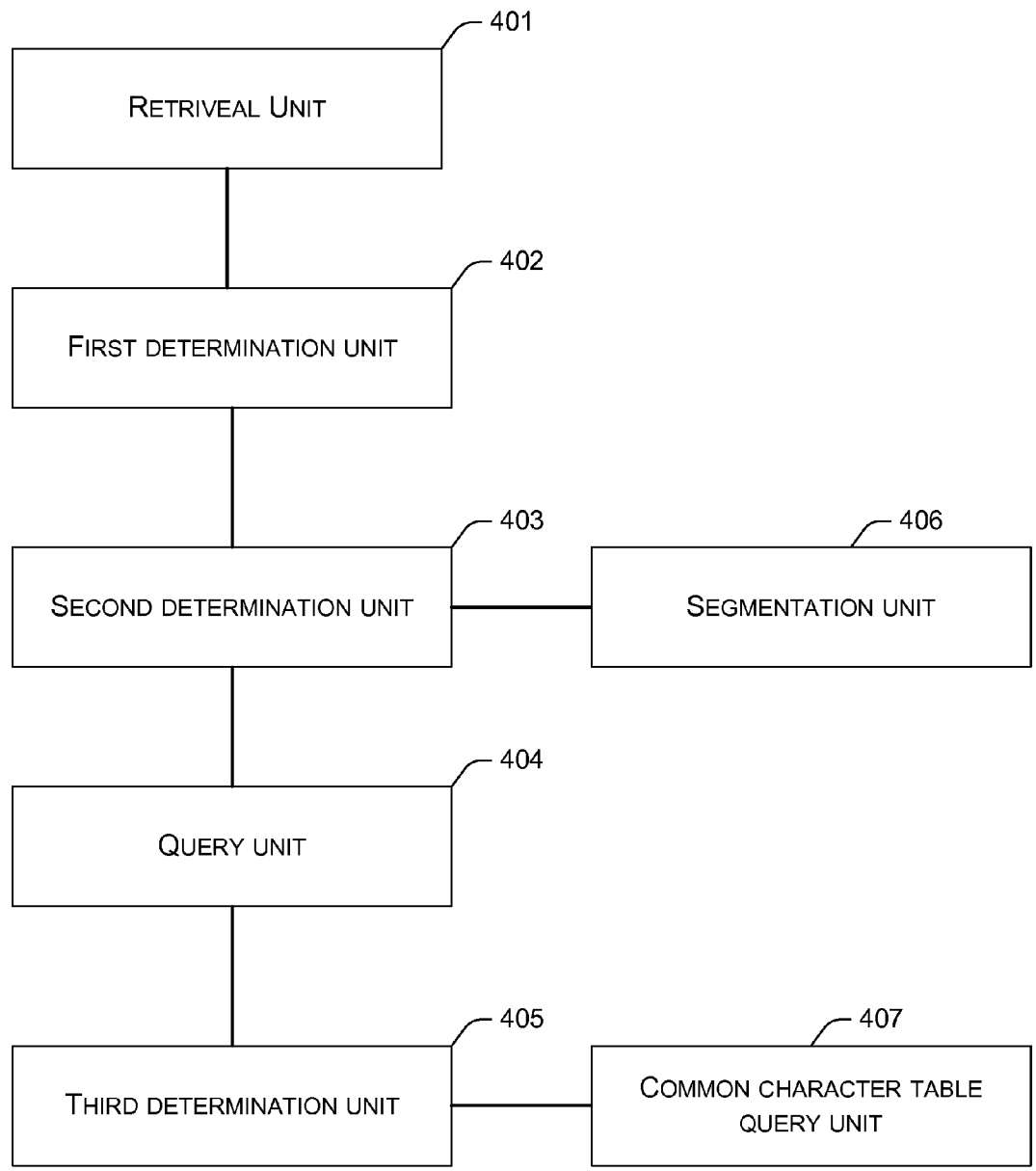
FIG. 4 illustrates an apparatus diagram for identifying Chinese synonym according to the present disclosure.

This disclosure also provides an apparatus for identifying Chinese synonym by reference to FIG. 4. The apparatus includes: a retrieval unit 401, a first determination unit 402, a second determination unit 403, a query unit 404, and a third determination unit 405.

The retrieval unit 401 is configured to obtain any two Chinese words to be identified. In a search engine application, a search log saves the keywords that users regularly query. Between the two Chinese words to be identified, one is the keyword input by the user in the search engine; the other is obtained from the search log according to the keyword input by the user.

The first determination unit 402 is configured to determine that a shortest edit distance between the two Chinese words is less than or equal to an edit distance threshold and to inform the second determination unit 403.

The second determination unit 403 is configured to determine that both of the two Chinese words exist in a preset knowledge database and to inform the query unit 404.

The query unit 404 is configured to find a smallest granularity type with highest weight value for each Chinese word in the knowledge database.

The third determination unit 405 is configured to determine the two Chinese words are synonyms when the two Chinese words have the same smallest granularity type with highest weight value, and to determine the two Chinese words are non-synonyms when the two Chinese words do not have the same smallest granularity type with highest weight value.

The apparatus can also include a segmentation unit 406 configured to segment one or more unfound Chinese words in the knowledge database and then to inform the second determination unit 403.

The second determination unit 403 is also configured to determine that all of the Chinese words after segmentation exist in the knowledge database and to inform the query unit 404, and to determine that not all of the Chinese words after segmentation exist in the knowledge database and to inform the segmentation unit 406.

The apparatus can further include:

A common character table query unit 407 configured to determine that changeable words or characters of the two Chinese words, if any, are among changeable characters of a preset common character table and to inform the third determination unit 405 to determine that the two Chinese words are synonyms, and to determine that changeable words or characters of the two Chinese words, if any, are not among changeable characters of the preset common character table and to inform the third determination unit 405 to determine that the two Chinese words are non-synonyms.

The knowledge database comprises: one or more terms and concepts. Each term or concept corresponds to at least one type and each type corresponding to the term or concept has a weight value.

The knowledge database and common character table are obtained from experience accumulation.

The apparatus for identifying synonym can be a separate server, a part of a search engine, or a part of another server.

The disclosed apparatus for identifying Chinese synonym will not surprise the user as the disclosed apparatus firstly determines the shortest edit distance between the Chinese words to be identified and thus there are few expression variances between the synonyms. In addition, the disclosed apparatus uses knowledge database to validate semantics of the Chinese words to be identified or more strictly limits the semantics of the words to be identified through the smallest granularity type, and thus greatly improves accuracy of identification of synonym. Furthermore, the disclosed apparatus uses the common character table to re-validate different characters of the Chinese words to be identified and further guarantees effects of synonym identification.

Figure 5:
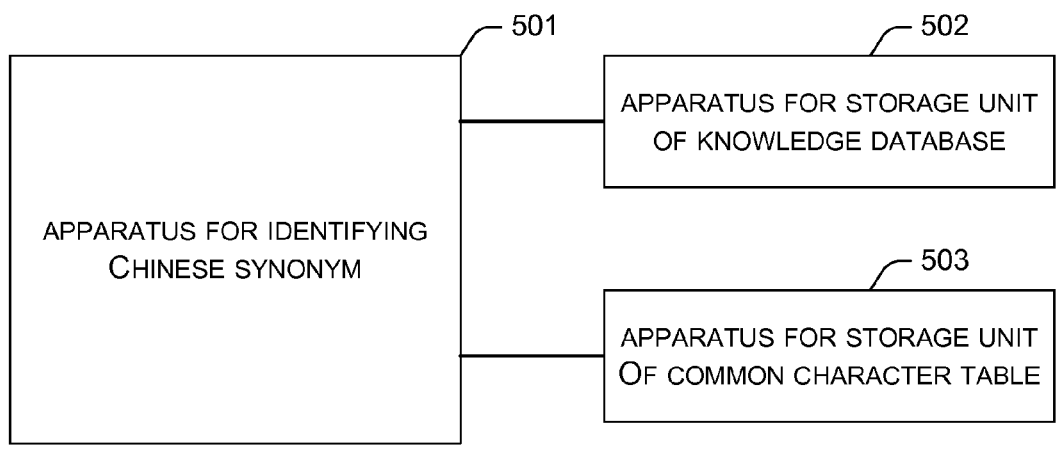
FIG. 5 illustrates a schematic diagram of a system for identifying Chinese synonym according to the present disclosure.

Referring to FIG. 5, this disclosure also provides a system for identifying Chinese synonym in a search engine. The system includes: an apparatus for identifying Chinese synonym 501 and an apparatus for storage unit of knowledge database 502.

The apparatus for storage unit of knowledge database 502 is configured to save words/characters, types of words/characters, and weight values of the types.

The apparatus for identifying Chinese synonym 501 is configured to obtain any two Chinese words to be identified; to determine that a shortest edit distance between the two Chinese words is less than or equal to an edit distance threshold, and then to determine that both of the two Chinese words exist in the preset apparatus for storage unit of knowledge database 502 and to separately search a smallest granularity type with highest weight value for each Chinese word in the apparatus for storage unit of knowledge database 502; to determine that the two Chinese words are synonyms when the two Chinese words have the same smallest granularity type with highest weight value, and to determine the two Chinese words are non-synonyms when the two Chinese words do not have the same smallest granularity type with highest weight value.

The apparatus for identifying Chinese synonym 501 can be further configured to segment one or more unfound Chinese words and to determine whether all of the Chinese words after segmentation exist in the apparatus for storage unit of knowledge database 502, and, if an answer is yes, to search the smallest granularity type with highest weight value for each of such Chinese words in the apparatus for storage unit of knowledge database 502 and to perform following steps, or to perform this present step again.

The system also includes an apparatus for storage unit of common character table 503 configured to store changeable characters and unchangeable characters.

The apparatus for identifying Chinese synonym 501 can also be configured to determine that the two Chinese words are synonyms when changeable words or characters of the two Chinese words, if any, are among changeable characters of the preset common character table, and to determine that the two Chinese words are non-synonyms when changeable words or characters of the two Chinese words are not among changeable characters of the preset common character table The system for identifying synonym can be a separate server, a part of a search engine, or a part of another server.

The disclosed system for identifying Chinese synonym will not surprise the user as the disclosed apparatus firstly determines the shortest edit distance between the Chinese words to be identified and thus there are few expression variances between the synonyms. In addition, the disclosed system uses knowledge database to validate semantics of the Chinese words to be identified or more strictly limits the semantics of the words to be identified through the smallest granularity type, and thus greatly improve accuracy of identification of synonym. Furthermore, the disclosed system uses the common character table to re-validate different characters of the Chinese words to be identified and further guarantees effects of synonym identification.

Figure 7:
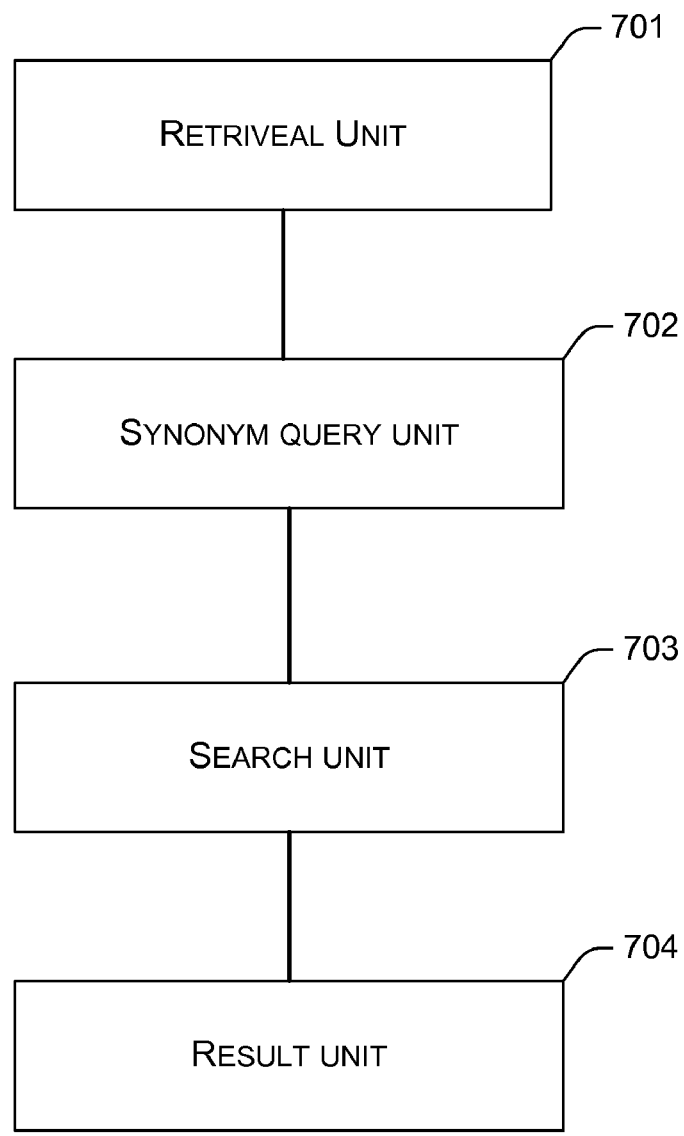
FIG. 7 illustrates an exemplary flowchart of a search apparatus according to the present disclosure.

Referring to FIG. 7, this disclosure also discloses a device for search. The device includes a retrieval unit 701, a synonym query unit 702, a search unit 703, and a result unit 704.

The retrieval unit 701 is configured to receive a query request from a user. The quest request includes a query term.

The synonym query unit 702 is configured to find a synonym of the query term by using the query term to search a preset synonym database.

The search unit 703 is configured to conduct search by using the query term and the synonym of the query term.

The result unit 704 is configured to return search results to the user.

The disclosed device for identifying Chinese synonym will not only avoid surprising the user but also enriching search results so that the returning result better meet the user's need.

To be noted, this disclosure only uses Chinese language as an example to describe the method for identifying Chinese synonym. The disclosure is not limited to identification of Chinese synonym and can be applicable for identification of synonyms Japanese, Korean, and other languages by using the disclosed techniques or making small modifications, equivalent replacements, improvements on the disclosed techniques. In addition, terminologies such as a first and a second are only used to differentiate one entity or operation with another entity or operation and do not necessarily require or imply that there are actual relationships or orders between these entities or operations. Terminologies "include", "contain", or any variance means non-exclusive inclusion so that the process, method, goods, or device including multiple elements includes not only the multiple elements but also other elements that are not expressed or any other inherent element of the process, method, goods, or device.

For convenience of description, parts of the described device or system are described into different units according to functions. It is apparent that functions of each unit can be integrated within one or multiple instances of software or hardware for implementation of this disclosure.

The person of ordinary skill in the art is capable to understand that part or all of the disclosed techniques can be implemented by programs to instruct relevant hardware. The programs can be stored in any readable storage medium of computer, such as ROM/RAM, disc, CD, and etc.

The above is just better examples of this disclosure and shall not be used to limit the protection scope of this disclosure. Any modification, equivalent replacement, improvements, if under the spirit and principle of this disclosure, shall be included in the protection scope of this disclosure.

What is claimed is:

1. A method for identifying synonyms, the method comprising:
    obtaining, by a server, any two words to be identified;
    determining that a shortest edit distance between the two words is less than or equal to an edit distance threshold;
    determining whether both of the two words exist in a preset knowledge database:
        if at least one of the two words does not exist in the preset knowledge database, segmenting one or more unfound words;
            determining whether all of the words after segmentation exist in the knowledge database; and
            if all of the words after segmentation exist in the knowledge database, finding a smallest granularity type with highest weight value for each such word in the knowledge database; and
        if both of the two words exist in the preset knowledge database, then finding the smallest granularity type with highest weight value for each word in the knowledge database;
    determining whether the two words have a same smallest granularity type with highest weight value;

if the two words have the same smallest granularity type with highest weight value, then determining that the two words are synonyms; and if the two words do not have the same smallest granularity type with highest weight value, then determining that the two words are non-synonyms.

2. A method as recited in claim 1, further comprising:

determining, by the server, whether any changeable character or word of the two words is among changeable characters of a preset common character table;

if any changeable character or word of the two words is among changeable characters of the preset common character table, then determining that the two words are synonyms; and if any changeable character or word of the two words is not among changeable characters of the preset common character table, then determining that the two words are non-synonyms.

3. A method as recited in claim 1, wherein the knowledge database comprises:

one or more terms and concepts, each term or concept corresponding to at least one type, each type corresponding to the term or concept having a respective weight value.

4. A method as recited in claim 1, wherein the finding the smallest granularity type with highest weight value for each word in the knowledge database comprises:

searching a term or concept corresponding to each word in the knowledge database; and finding the smallest granularity type with highest weight value for each word according to the at least one type corresponding to the term or concept and relevant weight value.

5. A method as recited in claim 1, further comprising:

if determining that the two words are synonyms, then saving such identified synonyms in a synonym database.

6. A method as recited in claim 5, further comprising:

receiving, by a search engine, a query request from a user, the query request including a query term to be searched;

searching, by the search engine, the query term in the synonym database to find a synonym of the query term;

conducting, by the search engine, a search by using the query term and the synonym of the query term; and returning, by the search engine, a result including both the query term and the synonym of the query term to the user.

7. An apparatus for identifying synonyms, the apparatus comprising:

a server, the server including hardware, the server storing:

a retrieval unit that obtains any two words to be identified;

a first determination unit that determines that a shortest edit distance between the two words is less than or equal to an edit distance threshold to inform a second determination unit;

the second determination unit that determines that both of the two words exist in a preset knowledge database and to inform an query unit;

the query unit that finds a smallest granularity type with highest weight value for each word in the knowledge database; and a third determination unit that determines whether the two words have a same smallest granularity type with highest weight value, if the two words have the same smallest granularity type with highest weight value, a common character table query unit that determines whether any changeable character or word of the two words is among changeable characters of a preset common character table, if any changeable character or word of the two words is among changeable characters of the preset common character table, the common character table query unit informs the third determination unit to determine that the two words are synonyms; and if any changeable character or word of the two words is not among changeable characters of the preset common character table, the common character table query unit informs the third determination unit to determine that the two words are non-synonyms; and if the two words do not have the same smallest granularity type with highest weight value, the third determination unit determines that the two words are non-synonyms.

8. An apparatus as recited in claim 7, further comprising:

a segmentation unit that segments one or more unfound words in the knowledge database and then informs the second determination unit, wherein the second determination unit is further configured to determine that all of the words after segmentation exist in the knowledge database and to inform the query unit, and to determine that not all of the words after segment exist in the knowledge database and to inform the segmentation unit.

9. An apparatus as recited in claim 7, wherein the knowledge database comprises:

one or more terms and concepts, each term or concept corresponding to at least one type, each type corresponding to the term or concept having a weight value.

10. An apparatus as recited in claim 7, wherein the apparatus is a server or a search engine.

11. An apparatus as recited in claim 7, the apparatus further comprising:

a retrieval unit that receives a query request from a user, the query request including a term to be searched;

a synonym searching unit that finds a synonym of the term by searching the term in a synonym database;

a search unit that conducts a search by using the term and the synonym of the term; and a return unit that returns a search result to the user.

12. A server comprising hardware configured to perform operations comprising:

obtaining two words to be identified;

determining that a shortest edit distance between the two words is less than or equal to an edit distance threshold;

determining whether both of the two words exist in a preset knowledge database;

if at least one of the two words does not exist in the preset knowledge database, segmenting one or more unfound words;

determining whether all of the words after segmentation exist in the knowledge database; and if all of the words after segmentation exist in the knowledge database, finding a smallest granularity type with highest weight value for each such word in the knowledge database; and if both of the two words exist in the preset knowledge database, finding the smallest granularity type with highest weight value for each word in the knowledge database;

determining whether the two words have a same smallest granularity type with highest weight value;

if the two words have the same smallest granularity type with highest weight value, determining that the two words are synonyms; and if the two words do not have the same smallest granularity type with highest weight value, determining that the two words are non-synonyms.

13. A server as recited in claim 12, wherein the operations further comprise:
   determining whether any changeable character or word of the two words is among changeable characters of a preset common character table;
   if any changeable character or word of the two words is among changeable characters of the preset common character table, determining that the two words are synonyms; and
   if any changeable character or word of the two words is not among changeable characters of the preset common character table, determining that the two words are non-synonyms.

14. A server as recited in claim 12, wherein the knowledge database comprises: one or more terms and concepts, each term or concept corresponding to at least one type, each type corresponding to the term or concept having a weight value.

15. A server as recited in claim 12, wherein the finding a smallest granularity type with highest weight value for each word in the knowledge database comprises:
   searching a term or concept corresponding to each word in the knowledge database; and
   finding the smallest granularity type with highest weight value for each word according to the at least one type corresponding to the term or concept and relevant weight value.

16. A server as recited in claim 12, wherein the operations further comprise, in responsive to determining that the two words are synonyms, saving such identified synonyms in a synonym database.

17. A server as recited in claim 12, wherein the operations further comprise:
   receiving a query request from a user, the query request including a query term to be searched;
   searching the query term in the synonym database to find a synonym of the query term;
   conducting a search by using the query term and the synonym of the query term; and
   returning a result including both the query term and the synonym of the query term to the user.

18. A method for identifying synonyms, the method comprising:
   obtaining, by a server, any two words to be identified;
   determining that a shortest edit distance between the two words is less than or equal to an edit distance threshold;
   determining whether both of the two words exist in a preset knowledge database:
   if both of the two words exist in the preset knowledge database, then finding a smallest granularity type with highest weight value for each word in the knowledge database;
   determining whether the two words have a same smallest granularity type with highest weight value;
   if the two words have the same smallest granularity type with highest weight value, determining whether any changeable character or word of the two words is among changeable characters of a preset common character table;
   if any changeable character or word of the two words is among changeable characters of the preset common character table, determining that the two words are synonyms; and
   if any changeable character or word of the two words is not among changeable characters of the preset common character table, determining that the two words are non-synonyms; and
   if the two words do not have the same smallest granularity type with highest weight value, determining that the two words are non-synonyms.

* * * * *